Patented Oct. 26, 1937

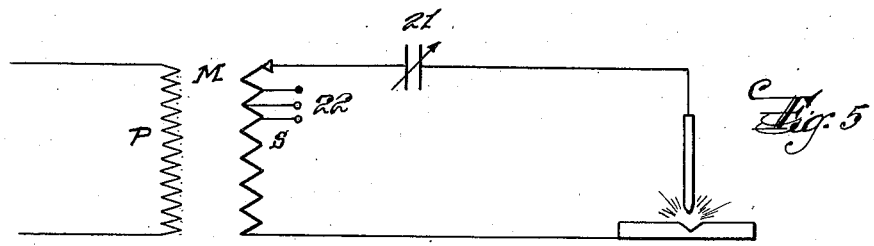
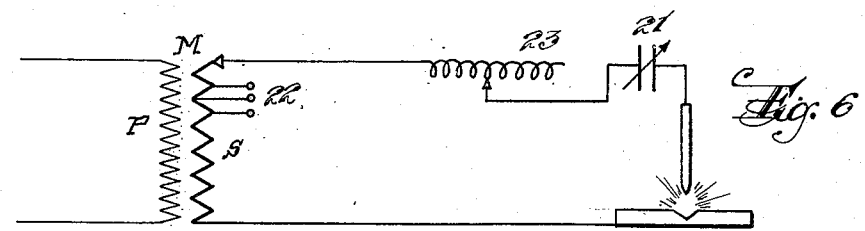
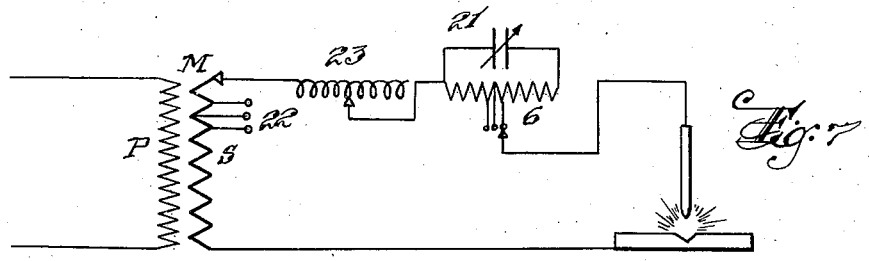
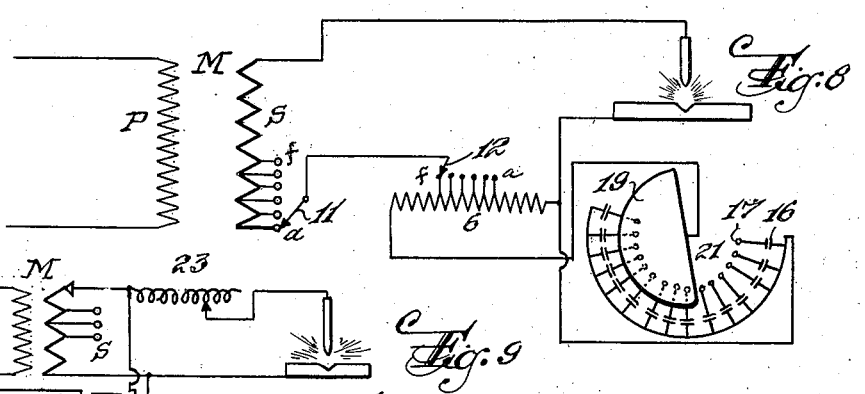
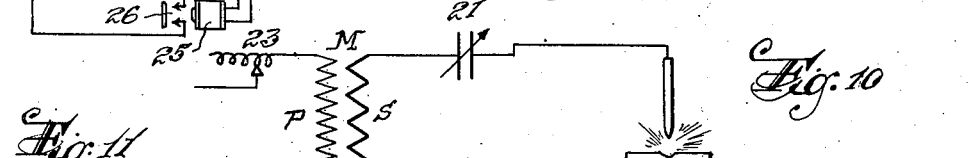
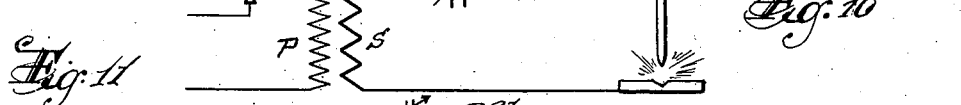
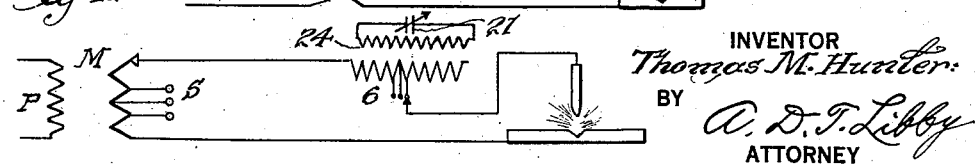

2,097,327

UNITED STATES PATENT OFFICE 2,097,327

ARC WELDING SYSTEM

Thomas M. Hunter, East Orange, N. J., assignor to American Transformer Company, Newark, N. J.

Application November 30, 1935, Serial No. 52,314

9 Claims. (Cl. 219—8)

This invention relates to an electric arc welding system.

When alternating current is used for arc welding, the arc tends to go out as the voltage wave passes through zero at each successive alternation, and in order to make a persistent arc, whereby the same may be held and the welding operation made continuous, various arrangements have been proposed, some of which involve the use of inductance coils with or without resistances connected in series with the source of current and the arc. Other alternating current arc welding systems propose the use of specially designed transformers having a large inductance or reactance inherent in the transformer. Other schemes propose the use of high frequency devices connected across the arc welding electrodes in order to make an ionized path for the regular welding current, thereby assisting in its passage and thus tending to prevent the arc from going out. Other schemes have proposed the use of separate resonance circuits included in the arc circuit.

From my experience with all of these arrangements, each has its own particular objectionable features, and it is therefore the principal object of my invention to provide an arc welding system, using alternating current as the source of power, in which the apparatus used is much more efficient electrically than prior art apparatus in systems using this type of current for arc welding.

A further object of my invention is to provide an alternating current arc welding system which, while more efficient electrically, is much easier to operate, whereby better welds can be made at an increased speed of operation.

A further object of my invention is to provide, in an alternating current arc welding system, a unitary structural apparatus for the purpose which is much lighter in weight, cheaper to build, and because of its higher electrical efficiency, cheaper to operate.

Another object is to obtain easy and close adjustment of the current without having to change the open circuit voltage most suitable for a given condition, for instance, in the use of a given type of electrode for a given piece of work.

These and other objects will be clear to one skilled in this particular art, from a reading of the specification, taken in connection with the annexed drawings, wherein:

Figure 5 is a diagram of a circuit arrangement illustrating the principles involved in my invention.

Figure 6 is a diagram of a modified form of the invention.

Figure 7 is a modification of the diagrammatic arrangement shown in Figure 6.

Figure 8 shows a further modified, and what I term a preferred, form of using my invention.

Figure 9 shows another form which the invention may take.

Figure 10 is a modification of the arrangement shown in Figure 9.

Figure 11 shows a modification of the form shown in Figure 8.

Figure 1:
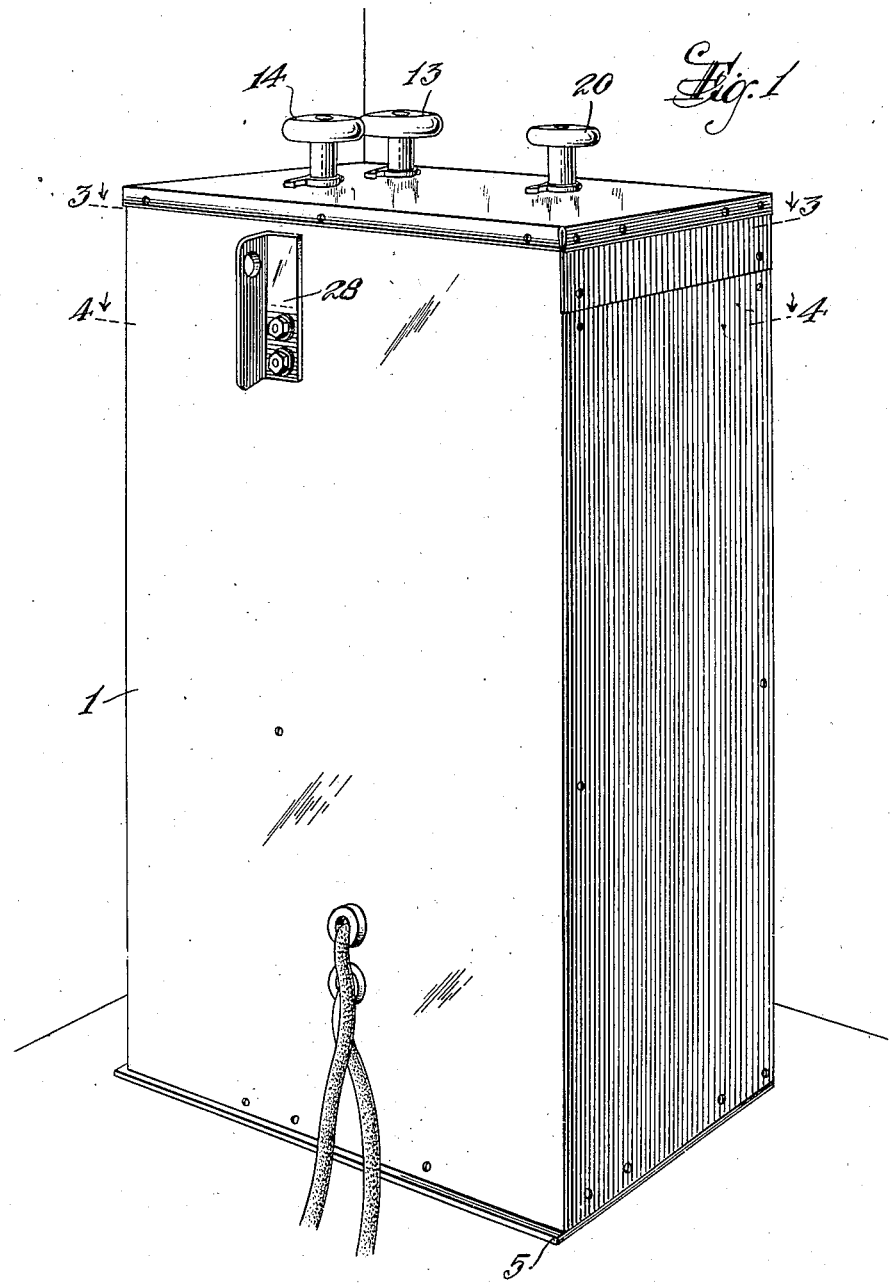
Figure 1 is a perspective view of a completely assembled unitary structural apparatus used in my alternating current arc welding system.

Referring now to the details, wherein like numbers refer to corresponding parts in the various views, 1 illustrates generally a framework which, in the claims, may also include the outer casing shown in Figure 1. The framework 1 may be built up in any desired manner to give sufficient strength and, as indicated, is made up of a plurality of angle irons 2 held together in any satisfactory manner as by bolts 3. The angle irons 2 are provided with lugs 4 for fastening the unit to a bottom frame member 5; also, the casing is provided with lugs 28 for lifting the apparatus. Preferably, the entire framework is built in two sections; section T and an adjacent section C.

Figure 2:
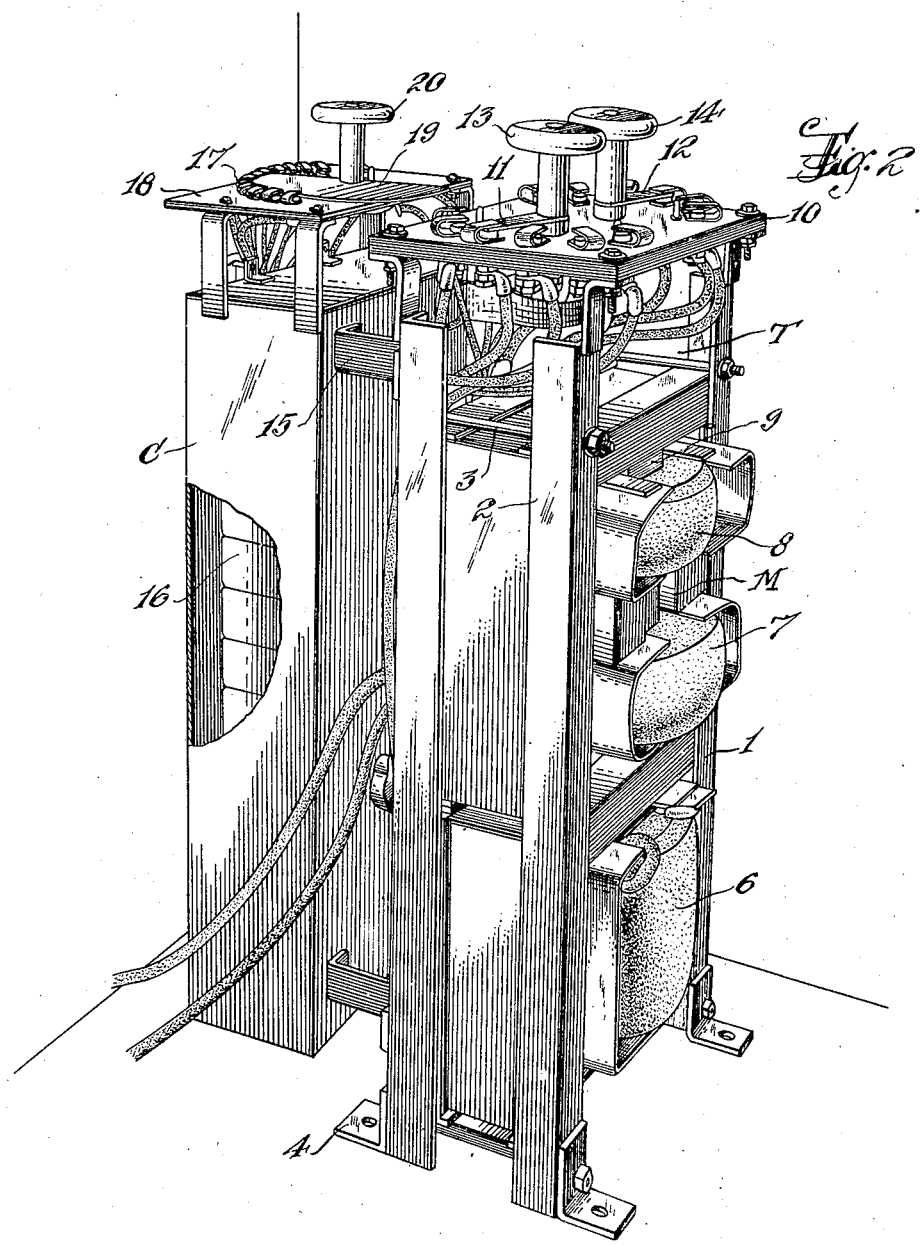
Figure 2 is a perspective view of the welding apparatus shown in Figure 1, with the outside casing removed and certain of the other parts removed to show the interior construction.
Figure 3:
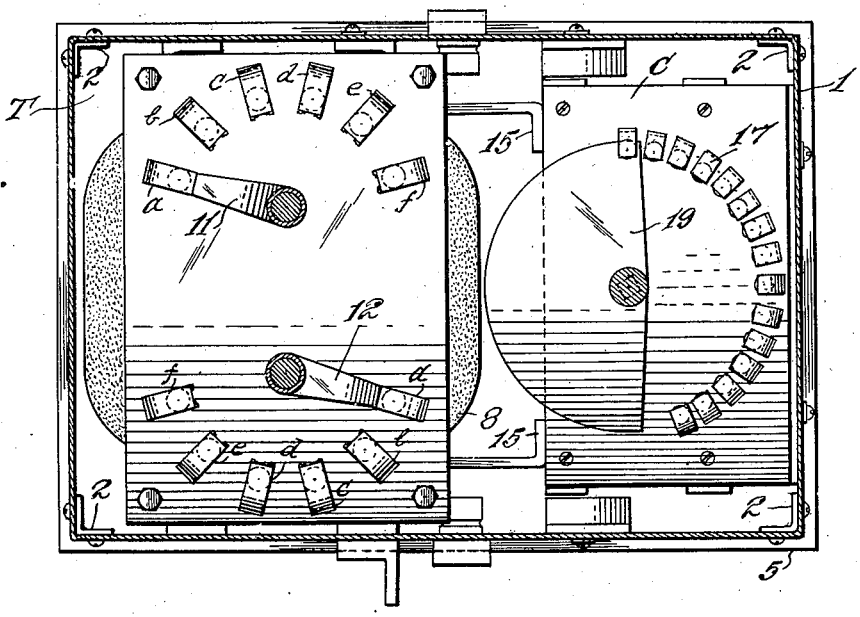
Figure 3 is a section about on the line 3—3 of Figure 1, just below the top cover plate.
Figure 4:
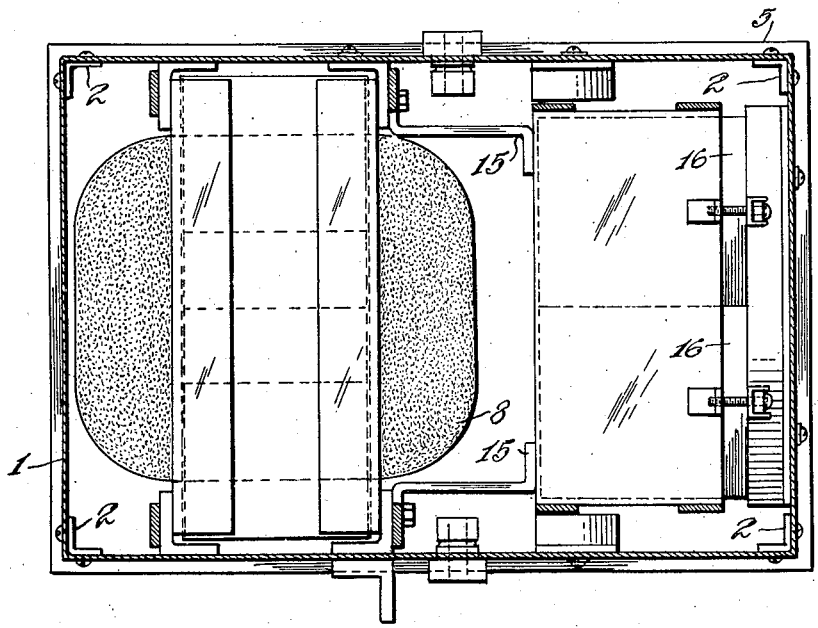
Figure 4 is a view approximately on the line 4—4 of Figure 1.

Section T carries the necessary windings inductively arranged on suitable cores of magnetic material. As illustrated in Figure 2, the section T has what I term a condenser transformer 6 positioned at the bottom of the framework, although it may be mounted in a different relation to the main transformer M (shown diagrammatically in Figure 8), which transformer, as shown in Figure 2, is mounted above the transformer 6. The main transformer M consists of a primary winding 7 and a secondary winding 8 which are arranged in spaced relation on a core 9 of suitable magnetic material. Because of this spaced relation, as indicated, the transformer M has a high reactance, the use of which will be later pointed out. At the top part of the section T is a switch plate 10 of good insulating material, carrying a pair of switch blades 11 and 12 operated respectively by handles 13 and 14. Associated with the switch blade 11 are a plurality of contacts, six being shown and numbered a, b, c, d, e, and f. Likewise, the switch blade 12 has a similar set of contacts, these switch blades and contacts being used in the manner hereinafter set forth.

The section C is fastened to the section T in any satisfactory manner as by frame members 15. The section C is more in the nature of a closed casing, within which are stacked a plurality of condensers 16 which are connected in parallel, as indicated more particularly in Figure 8, to provide a capacity of suitable amount. The units which I have used in the machine illustrated are of four mf capacity. A certain number of these may be permanently connected in parallel to give a certain fixed capacity, while the balance of the units may have one side permanently connected to the corresponding side of the aforesaid fixed unit, while the opposite terminals of these units are brought out to switch contacts 17 carried on an insulating plate 18 mounted at the top of the section C. A sector plate 19, operated by a control handle 20 is adapted to successively connect the contacts 17 and the condensers connected thereto in parallel relationship, as clearly indicated in Figure 8, for a purpose to be later described.

The operation of my system comprises, broadly, the use of an inductance and capacity either connected directly in series in the arc circuit, or in an arrangement which will give the series effect. It is well-known that an alternating current welding arc can be more easily maintained by the use of a high inductance in the arc circuit, because of the large amount of energy which can be stored in the inductance, which tends to hold the arc if the arc becomes too long, thereby tending to go out. However, this high inductance prevents getting the required current at the arc to melt the metal of the electrode as well as the material of the work-piece, and in such a system, to get the necessary current through to the arc, a high open circuit voltage is required, which is bad from an operating standpoint, because the operator has to replace the electrodes, as they are used up, in the holder to which this high voltage is connected, and, as the work electrode is usually grounded, if there is any dampness at all on the floor or workpiece, the operator is very likely to get a severe shock from this high voltage.

To overcome this objectionable feature, I propose to use a capacity unit 21 (see Figure 5) in series with the transformer M which is indicated with spaced windings P and S to provide a high reactance. Preferably, the secondary S is provided with taps 22, whereby the open circuit voltage may be varied over a certain range. With this arrangement, I have provided two storage reservoirs for the energy, which are from 150° to 180° out of phase with each other, usually close to 180°, the difference depending on the amount of voltage required at the arc, and this is determined by the work to be performed, which in turn determines the size of the electrode and current required. The voltage across the condenser 21 and the secondary S of the transformer M varies from about seventy to one hundred forty volts when the open circuit voltage is about fifty, and the arc voltage in the neighborhood of from twenty to twenty-five volts. By using the adjustable condenser or capacity 21, as indicated in Figure 5, I am able to use even more inductance than would be possible when inductance alone is used, and at the same time keep the open circuit voltage at a low value, because the condenser lowers the impedance of the circuit and permits current to flow with this very much lower open circuit voltage.

In the arrangement shown in Figure 6, the main transformer M is closely coupled, or one having low reactance which is, however, provided by the adjustable inductance coil 23 connected in series with the condenser 21 and the arc electrodes.

In Figure 7, a low reactance main transformer M is used, the necessary inductance being provided by the adjustable inductance 23. In this case, however, the capacity 21 is connected to the secondary of the auto-transformer 6, which does not change the effect of the capacity in circuit except to reduce the amount required, due to the fact that the amount of capacity necessary is proportional to the square of the inverse ratio of the auto-transformer. This auto-transformer, itself, offers no inductance to the circuit because of the well-known law of transformer action; that is to say, the ampere turns in the primary are equal and opposite to the ampere turns in the secondary, and generally cancel out the magnetic effect on the core due to the load current. Stated in another way, there is little or no voltage drop in the circuit due to the auto-transformer; whatever drop in voltage there is, is merely a very small ohmic drop. In other words, the auto-transformer 6 in itself offers a negligible impedance to the flow of current in the arc welding circuit.

The use of the auto-transformer of Figure 7 is better exemplified in Figure 8, which is my preferred form of applying my invention in practice. In this figure, the main transformer M has primary and secondary windings arranged in spaced relation, as shown in Figure 5 and as shown mechanically in Figure 2. The taps a to f are adapted to be connected to the switch blade 11 as has been explained, the switch blade 11 being connected to the switch blade 12 associated with the auto-transformer 6, across the secondary of which the adjustable condenser 21 is connected.

In this arrangement, the switch 12 can be operated so as to raise the voltage on the condenser 21 in the ratio of the primary to the secondary turns of the auto-transformer 6 and thereby reduce the amount of capacity in microfarads required in proportion to the square of the inverse ratio of these turns. For example, stated numerically, if the turn ratio of the transformer is one to five, one hundred mf across the secondary of the auto-transformer would be equal to twenty-five hundred mf if inserted without the auto-transformer, as in Figure 5. If the transformer ratio were one to one, there would be no transformer action, and then the transformer would act as a straight inductance, which I do not want in the arrangement of Figure 8, or the other circuits.

One great advantage which I have found with this particular arrangement, is that the welding current can be controlled by means of the capacity switch 19 used alone. For example, I have been able to control welding current from seventy to about two hundred twenty-five amperes with the machine illustrated in Figures 1 and 2, by varying the capacity from about sixty mf to one hundred twenty mf. Hence, my initial permanently connected condensers will be in the neighborhood of sixty mf and the other condensers 16, as shown in Figure 8, will be four mf units, the addition of which, one at a time, will produce very small changes in the welding current; as, for example, approximately six amperes when the open circuit voltage is set to forty-five, and about eight ampere step changes when the open circuit voltage is set at fifty-five; and about nine and one-half amperes when the open circuit voltage is set at sixty-five.

By the arrangement of Figure 8, it is at once seen that the auto-transformer, without introducing any impedance itself in the circuit, produces means for materially reducing the amount of capacity required to bring about the new and improved welding conditions.

Another important feature of the arrangement shown in Figure 8 is that the auto-transformer acts to discharge the condenser connected across its secondary when the arc goes out, as happens at the time when the electrode has been consumed or the arc has been unduly lengthened by the operator. This arrangement is not to be confused with any tuned circuit arrangement such as an inductance and capacity in parallel relationship tuned to some particular frequency and the said parallel circuit, connected in series with the arc, for the reason that with such an arrangement the arc current must still flow through this impeding circuit, whereas with my series arrangement; i. e., the capacity in series relation with the inductance and arc, the impedance of the arc circuit is reduced by virtue of the capacity, allowing, as has been explained heretofore, a greater flow of current with a lower open circuit voltage, yet with high inductance.

I have found that capacity and inductance must be properly selected so as to get stable welding conditions, and to obtain this, I prefer to interlock the switch blades 11 and 12 and control from one hand-wheel, selecting the taps on the welding transformer M and the auto-transformer 6 so as to get the proper capacity-inductance relations under all conditions.

The arrangement shown in Figure 11 is in effect the same as in Figure 8, the only difference being that the transformer 6 has a separate secondary 24 connected to the condenser 21. Figure 9 is similar to Figure 6, except that the condenser 21 is inserted in the primary, it being understood that the capacity 21 and the inductance 23 are of a size to produce the same result as in Figure 6.

In Figure 10 the location of the inductance 23 and capacity 21 is reversed. It may be stated that the arrangement of the capacity 21 as shown in Figures 5, 6, and 10 will produce satisfactory welding, but these systems are open to the objection that the charge built up in the condensers during the welding operation cannot be discharged automatically, which charge should be dissipated immediately the arc goes out. This objectionable feature is overcome in the arrangement shown in Figure 9, in which a relay 25 is connected across the arc circuit either directly at the arc electrodes or at some point, as indicated. In this arrangement, when the voltage increases on lengthening of the arc or on its going out, the relay 25 is operated to close the contacts 26, thereby short-circuiting and discharging the condenser 21. Of course this arrangement may be used in connection with any of the other figures when necessary. This difficulty or objectionable feature is not present in the arrangements of Figures 8 and 11.

With the preferred arrangement, as shown in Figure 8, I have obtained, as has been pointed out, an arrangement in which the open circuit voltage may be adjusted over a range of from thirty-five to seventy volts, depending on the types of electrodes to be used; that is to say, whether bare electrodes, or flux or slag-covered, and also depending on the nature of the work; and the arrangement, as has been described, is such that the welding apparatus, such as shown in Figures 1 and 2, can be made much smaller—that is, of less size and weight—than prior art devices with which I am familiar, having the same ampere capacity. Such a welding unit or apparatus can therefore be built at much less cost and the construction is such that the leakage in the transformers can be concentrated, thereby getting away from the very troublesome problem of eddy current losses in the transformer. Consequently, I am able to use a steel housing with steel clamps which can be welded together very cheaply to make up the framework, whereas prior art structures have required the use of wooden or non-magnetic metallic materials. In addition, the transformers themselves do not need to be wound with special heat-resisting materials as in many prior art devices.

Thus, with the construction shown, I am able to attain all the principal objects of the invention recited, as well as many ancillary objects.

What I claim is:

1. In an arc welding circuit, a main supply transformer having a high reactance between its primary and secondary windings, the arc circuit being supplied with current from the said secondary, an auto-transformer having its primary winding in series with the arc circuit, and a capacity connected across the secondary of the auto-transformer, the primary of the auto-transformer and the secondary of the main transformer being interconnected so as to get the proper capacity-inductance relations under varying conditions of welding.

2. In a metallic arc welding system having a source of alternating current supply for the arc, an inductance between said source and the arc electrodes, and a capacity in the system disposed to give an effect as though connected directly in series with the inductance, the relation between the inductance and capacity being such that the open circuit voltage across the electrodes is materially lower than that heretofore utilized in arc welding circuits, the capacity being adjustable to vary the current without changing the open circuit voltage.

3. An alternating current metallic arc welding system including an inductance of relatively high value between the source of supply and the arc electrodes, and condenser means in series with the inductance for reducing, at the arc welding electrodes, the high open circuit voltage required with such high inductance, to a value as herein set forth, the condenser being adjustable to vary the current, without changing the open circuit voltage.

4. In a metallic arc welding system having a source of alternating current supply for the arc, an inductance between said source and the arc electrodes, and a capacity in the system disposed to give an effect as though connected directly in series with the inductance, the relation between the inductance and capacity being such that the open circuit voltage across the electrodes is materially lower than that heretofore utilized in arc welding circuits, the capacity being adjustable to vary the current without changing the open circuit voltage, and means for discharging the said capacity when the arc goes out.

5. In an alternating current metallic arc welding circuit, an inductance and a capacity connected in series with the arc electrodes, the inductance and capacity being interrelated so that the open circuit voltage across the electrodes is materially lower than the open circuit voltage now adopted as standard in the arc welding art, and means for varying the capacity of the condenser to vary the current, without changing the open circuit voltage, for a given setting of said open circuit voltage.

6. In an alternating current arc welding circuit, a high reactance main transformer having primary and secondary windings, a second transformer having primary and secondary windings, the primary winding being in series with the arc and secondary of the main transformer, and an adjustable condenser unit bridged across the secondary of said second transformer, the primary of the second transformer and the secondary of the main transformer being variably interconnected so as to get the proper capacity-inductance relations under all conditions of welding.

7. In an alternating current arc welding system, a main feed transformer, the secondary of which is in a series circuit containing the arc electrodes, said circuit having considerable inductance therein, as well as a capacity connected to give a series effect, the relation between the inductance and capacity being such as to give a relatively low open circuit voltage, and means including taps on the capacity for changing the arc current from minimum to maximum without changing the open circuit voltage.

8. In an alternating current arc welding system having inductance and capacity in series relationship with the arc, with means for adjusting the capacity to vary the current in the arc welding circuit, means including an auto-transformer connected across the capacity for automatically selecting and maintaining stable arc welding conditions, said means including taps on the inductance and auto-transformer connected to switch contacts brought into circuit by switch blades connected preferably in interlocking relationship.

9. In an alternating current arc welding system having a source of supply, means for obtaining a relatively low open circuit voltage across the welding electrodes, and a voltage across the arc higher than the open circuit voltage when the arc tends to go out, said means including an inductance of relatively high value between the source of supply and the arc electrodes, and a capacity connected for series effect in the arc circuit, the capacity being adjustable to vary the current in the arc circuit without changing the open circuit voltage.

THOMAS M. HUNTER.